United States Patent [19]
Smith et al.

[11] Patent Number: 5,644,661
[45] Date of Patent: Jul. 1, 1997

[54] IMAGE INTERPOLATOR FOR AN IMAGE DISPLAY SYSTEM

[75] Inventors: Robert William MacLaughlin Smith, Gloucester, England; Alastair Miles Sinton, Taupo, New Zealand; Francis Joseph McArdle, Sheffield, England

[73] Assignee: British Technology Group Limited, London, England

[21] Appl. No.: 442,299

[22] Filed: May 16, 1995

Related U.S. Application Data

[63] Continuation of Ser. No. 142,987, Oct. 29, 1993, abandoned.
[51] Int. Cl.$^6$ .................................................. G06K 9/42
[52] U.S. Cl. .............................. 382/300; 302/274
[58] Field of Search ................................ 382/270, 272, 382/274, 298, 300, 131; 348/581; 358/457; 395/132, 126

[56] References Cited

U.S. PATENT DOCUMENTS

| | | | |
|---|---|---|---|
| 4,617,939 | 10/1986 | Brown et al. | 128/734 |
| 5,048,105 | 9/1991 | Adachi | 382/300 |
| 5,148,499 | 9/1992 | Matsumura | 382/300 |
| 5,179,641 | 1/1993 | Comins et al. | 395/132 |
| 5,329,614 | 7/1994 | Kidd et al. | 395/139 |

OTHER PUBLICATIONS

R. C. Gonzalez, "Digital Image Processing", Second Edition, pp. 249–250.

Smith, Robert W.M., "Design of a Real-time Impedance Imaging System for Medical Applications", Oct. 1990, pp. 101–110.

*Primary Examiner*—Jose L. Couso
*Assistant Examiner*—Matthew C. Bella
*Attorney, Agent, or Firm*—Cushman, Darby & Cushman IP Group of Pillsbury Madison & Sutro LLP

[57] ABSTRACT

An apparatus for interpolating an image from a plural number of image values for a display having an array of display pixels more numerous than the number of images. The apparatus includes a generating device, a designating device, and first and second applying devices. The generating device generates image signals based on image data representing an image of a living body and for designating an array of pixels based on the image signals. The designating devices designates as primary image pixels a limited plurality of display pixels within the array of pixels. The first applying device applies the image values each to a respective one or more of the primary image pixels. The second applying device applies the image values to the remaining display pixels of the array according to an allocation pattern associating each remaining display pixels with a particular one of the primary image pixels, such that the distribution of display pixels associated with each primary image pixel is, at a distance from the respective primary image pixel, increasingly sporadic with increasing distance from the respective primary image pixel.

11 Claims, 3 Drawing Sheets

IMAGE INTERPOLATOR FOR AN IMAGE DISPLAY SYSTEM

This is a continuation of application Ser. No. 08/142,987, filed on Oct. 29, 1993, which was abandoned upon the filing hereof.

TECHNICAL FIELD

This invention concerns an image interpolator for an image display system and finds application particularly—but not exclusively—in the display of tomographic images of a body, such as a human or animal body.

BACKGROUND OF THE INVENTION

Various different tomographic techniques for imaging bodies for medical and other purposes are known and have found practical application. These include X-ray computed tomography (CT), magnetic resonance imaging (MRI), single photon emission computed tomography (SPECT), positron emission tomography (PET), and electrical impedance tomography (EIT).

Considering the last-mentioned technique in more detail, EIT involves the application of electrical signals to peripheral points of a body under investigation and the measuring, at other peripheral points, of electrical voltages or currents. The measurements provide data sets which can be processed to form an image representing the distribution of electrical conductivity or resistivity over a section of the body. EIT provides a relatively inexpensive tomographic technique in terms of the equipment required and does not involve any of the risks associated with some other techniques, such as radiography. A description of an EIT tomographic imaging system can be found in U.S. Pat. No. 4,617,939, where the method of 'backprojection' is disclosed, used for reconstructing the image from the data sets. This patent also teaches the method as applied to the study of rapid changes in the internal state of the body, enabling dynamic imaging of, for example, respiration response, cardiac response or gastric functioning.

Technical advances in hardware and software since the date of invention of the technique described in U.S. Pat. No. 4,617,939 now enable the production of EIT images in real time using parallel processing. Data acquisition at 25 frames per second (fps) is thus possible, enabling a clinician to display on a video monitor a real time colour image sequence representing the temporal changes of impedance within the body.

To be useful, the displayed image must appear large enough on the screen to be viewable from a reasonable distance. As presently used, a 16 electrode EIT system provides only 104 independent measurements at any one time. The backprojection image reconstruction matrix used generates 208 image pixels from these measurements, as this number of image pixels can conveniently be arranged within a circle inscribed within a square array of 16×16 pixels. If this image were displayed directly on a typical image display of, say, 512×512 display pixels, with each image pixel occupying one display pixel and the 208 occupied pixels being located immediately adjacent one another, the displayed image would be too small for convenient viewing. On a typical 14-inch diagonal CRT monitor the image would be only 7 mm in diameter.

To produce a larger and hence more useful displayed image, the relatively small number of image pixels must be spaced out over the array of many display pixels, and some means of image interpolation is required for allocating image display values to the display pixels located between the image pixels. An interpolation scheme should provide an acceptable transition between neighbouring image pixels whilst performing the required computation sufficiently quickly to enable the results to be displayed in real time, without requiring powerful and expensive hardware.

Two previous interpolation schemes used in EIT image display include nearest-neighbour interpolation and bilinear interpolation. In the former, a display pixel is assigned the image value of its most nearly adjacent image pixel, thus effectively merely enlarging each image pixel on the display. This method, also called 'zero-order interpolation', involves minimal computation time as a simple pattern remains constant in time, but can have the drawback of producing undesirable artifacts, such as very sharp boundaries within the displayed image which are highly distracting to the eye.

The method of bilinear interpolation involves calculating the image value of each display pixel for each frame as a linearly weighted sum of the values of the several most nearly adjacent image pixels, for example of the four nearest image pixels if these are distributed on a square lattice. Boundaries between image pixels are much less obtrusive than those obtained using nearest-neighbour interpolation. However, for each frame, a new image value has to be calculated for each display pixel, and this involves considerable calculation time. The image value of a particular display pixel is of course not necessarily that of any of the neighbouring image pixels, the values for the interpolated display pixels being in general both different from and more numerous than those of the image pixels. With the equipment currently commonly available it is unlikely that in the 40 ms frame time an image large enough for viewing by more than one or two persons is feasible. On the 14-inch CRT monitor the largest image producible in the available time per frame is approximately 50 mm in diameter.

SUMMARY OF THE INVENTION

According to the present invention, a method for interpolating an image for an image display system comprises:

designating as primary image pixels a limited plurality of display pixels comprised by and distributed among a more numerous array of such pixels, determining an allocation pattern whereby each remaining display pixel of the array is associated with a particular one of the primary image pixels, determining an image value for each of the primary image pixels, and applying each determined image value to the respective primary image pixel and to each of the remaining pixels which is associated therewith, wherein the allocation pattern is such that the distribution of display pixels associated with each primary image pixel is, at a distance from the respective primary image pixel, increasingly sporadic with increasing distance from said respective primary image pixel.

The selection may be made on a statistical or probabilistic basis, thus incorporating a random or pseudo-random element but weighted or biased in favour of the image value of the most nearly adjacent primary image pixel. Alternatively, the desired "softness" of the image may be achieved by using a carefully chosen allocation pattern, not necessarily containing any randomness.

The use of the method according to the invention combines the advantages of both the nearest-neighbour and the bilinear interpolation schemes. In any frame, no display pixel has an image value other than those of the primary image pixels, as is the case in nearest-neighbour interpolation. However, the weighted distribution of the display pixel allocation pattern gives an effect which may be referred to as 'spatial dithering' and, especially in the case of real-time dynamic imaging, gives a transition from one primary image pixel to the next that is effectively smooth and thus acceptable to the eye, of a quality comparable to that produced by bilinear interpolation.

Preferably, the allocation pattern is precalculated for the entire display, rather than being recalculated for each successive image displayed. The resulting choices, of which of the primary image pixels to use to assign an image value to each of the remaining display pixels, are then built into the source code of the computer program which drives the display. A display pixel can thus be permanently assigned an image value number, and the program merely needs to 'look up' the image value corresponding to this number in a programmable register containing the primary image pixel values, updated for each successive frame, or even within a single frame if more than one image is to be simultaneously displayed. By predetermining the allocation pattern in this way considerable computation time is avoided, compared to interpolation by the bilinear interpolation scheme.

The allocation pattern may be generated as a single pattern across the entire display. Alternatively, it may be generated for a single section of the display and repeated across the entire display, which will take less computation time. It can be appreciated that the present invention has application in any image display system where interpolation between primary image pixels is necessary or desirable. In particular, then, it is useful for situations in which available image data is very sparse compared with the number of display pixels available, such as EIT imaging and a number of other tomographic techniques.

BRIEF DESCRIPTION OF THE DRAWINGS

One method of carrying out the invention, and modifications thereof, will now be described, by way of example, with reference to the accompanying drawings, in which.

DETAILED DESCRIPTION OF THE INVENTION

Figure 1:
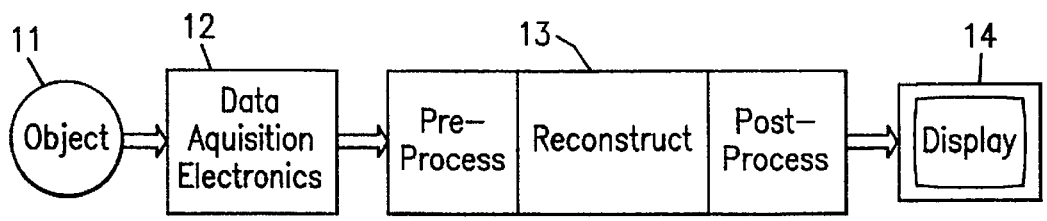
FIG. 1 schematically represents data flow through a real time colour EIT system.

FIG. 1 schematically represents data flow through a real-time colour EIT system. Impedance data from electrodes arranged on a body 11 is gathered by data acquisition electronics 12 and passed to a signal processor system 13 where the data undergoes preprocessing, then reconstruction by e.g. a backprojection algorithm, and finally postprocessing operations, such as filtering. The image is then passed to a display 14 for viewing.

Figure 2:
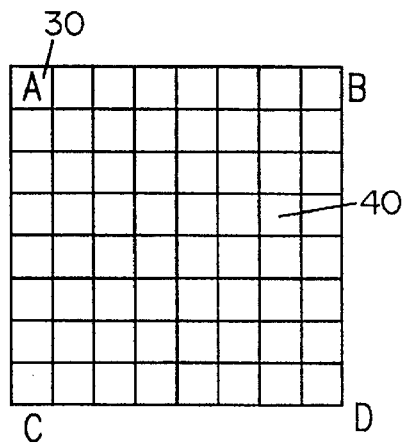
FIG. 2 shows a simple block display pixel array.

In a real-time EIT system displaying at 25 fps, the whole process must take place within 40 ms. With a 16 electrode system there can only be 104 independently determined data values, whereas the display hardware may provide a display of, say, 512×512 display pixels. It is therefore clear that the values of only 104 image pixels can be independently determined. It computationally inefficient to reconstruct an image with many times this number of pixels, and therefore interpolation is needed in order to obtain values for many more display pixels with which to fill a larger part of the 512×512 pixel display, so that the image is viewable from a reasonable distance, FIG. 2 shows a square block of display pixels in an 8×8 grid as a simple illustration of the above. Only four pixels at the corners of this grid as shown are primary image pixels, one of which being indicated by reference numeral 30 for which the colour values A, B, C and D have been determined independently using the data available. Sixty three display pixels, one of which being indicated by reference numeral 40 are shown to be filled using an interpolation scheme. Two interpolation schemes have conventionally been used. The simplest one is known as nearest-neighbour interpolation and its effect is merely to enlarge each primary image pixel in the display. Using this interpolation scheme, each display pixel is assigned the colour value of the nearest corner image pixel, with the result that the 8×8 grid shown in FIG. 2 is divided into four 4×4 squares each having a colour value A, B, C or D. In total, a square block of 64 display pixels will have, say, the colour A, as the block will extend into three adjacent 8×8 grids. This very crude interpolation scheme has, thus, the effect of displaying each image pixel as a square block of mutually adjacent display pixels. The allocation pattern to assign a colour value taken from one of the image pixels is, of course, preset and the calculation time required to generate an image according to this scheme is very short. The displayed image, though, has sharp discontinuities between the blocks of colour which are very distracting to the eye.

The second standard interpolation scheme employed to date is bilinear interpolation where, for a square array of pixels, the colour value of a display pixel in the array is calculated as a linearly weighted sum of the four corner image pixel values.

Clearly, the display image produced in this way will be much more amenable to viewing than that produced by means of the above-described nearest-neighbour interpolation. The boundaries between image pixels are much less obtrusive than for nearest-neighbour interpolation, a smooth gradation in colour appearing from one primary image pixel to the next. The disadvantage to this scheme is that, for each frame, a new image value has to be calculated for each display pixel individually. The calculated value, or colour, of each display pixel is not necessarily that of one of the neighbouring image pixels; indeed, it will in general be different. The method therefore demands high computation time and it is unlikely with display hardware currently commonly available that in the 40 ms frame time a display image large enough for viewing by more than one or two persons is possible. Obviously non-linear interpolation schemes employing 2nd or higher-order polynomials are also possible, but these further increase computation time needed.

Figure 3:
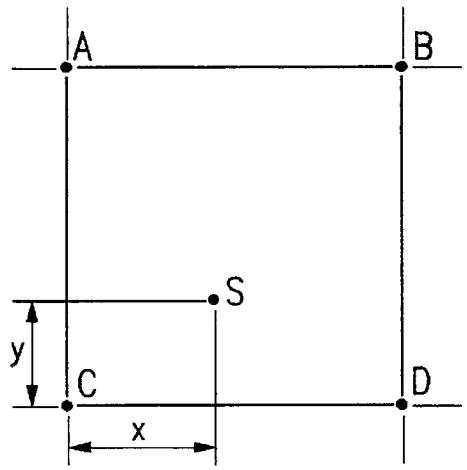
FIG. 3 schematically illustrates one way of effecting the method of interpolation according to the present invention.

The present invention employs an interpolation scheme which can be regarded as approximating to bilinear interpolated but in a less computationally demanding way. In a display such as the 8×8 square grid of FIG. 2, rather than calculating the image value for each display pixel individually as a respective function of the nearest primary image pixel values, which must be done afresh for each image, an allocation pattern is preset such that each display pixel is associated with one of the four primary image pixels at the corners of the grid and is given, in each frame, the same image value as that of the primary image pixel with which it is associated. The allocation pattern is generated or chosen such that it results in effective spatial dithering from one image pixel to the next, but with the distribution of the display pixels associated with each primary image pixel becoming increasingly sporadic with increasing distance from the respective primary image pixel; and conveniently this is done by randomly or pseudo-randomly assigning each display pixel to one of the four corner values and using the bilinear interpolation weighting to bias this allocation in favour of the nearest image pixel. Clearly, near the corners of the grid, the algorithm is more likely to select the pixel in that corner. In the centre of the grid, the weightings of the four corner pixels are equal and the process causes the pixels to be mixed up, or 'dithered'. Derivation of an allocation pattern in this manner will be described in more detail by reference to FIG. 3, which represents a square grid of display pixels cornered by four primary image pixels of respective colour values A, B, C and D. For any individual display pixel s with colour value S at a distance x, y from pixel C, four probabilities are calculated for its colour value, namely:

$p(S=C)=q=(1-x).(1-y)$ $p(S=D)=r=x.(1-y)$ $p(S=B)=s=x.y$ $p(S=A)=t=(1-x).y$ the values x and y being normalised so that the sides of the square grid are of length $\overline{AC}=\overline{CD}=1$.

In the above formulae, p(S=C), for example, is the probability that the colour value S is C or, in other words, that pixel has the colour value C. Using a random number generator, S is selected to be the colour value A, B, C or D, using the probabilities q,r,s and t to bias the decision in favour of the most adjacent primary image pixels.

Figure 4:
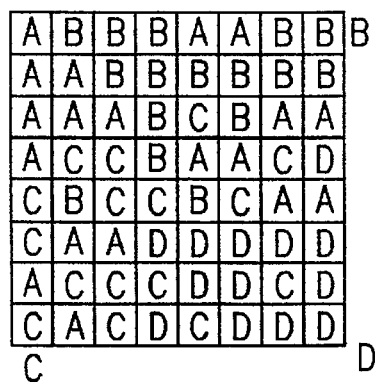
FIG. 4 shows the pixel array of FIG. 2 with a set of display pixel values selected according to the present invention.

A typical pattern derived in this manner is shown in FIG. 4, where the display pixels intermediate the image pixels have been selected according to the above process. The display image values are here assumed to be colour values, but this need not of course be the case and they may instead represent grey levels on a monochrome display.

Figure 5:
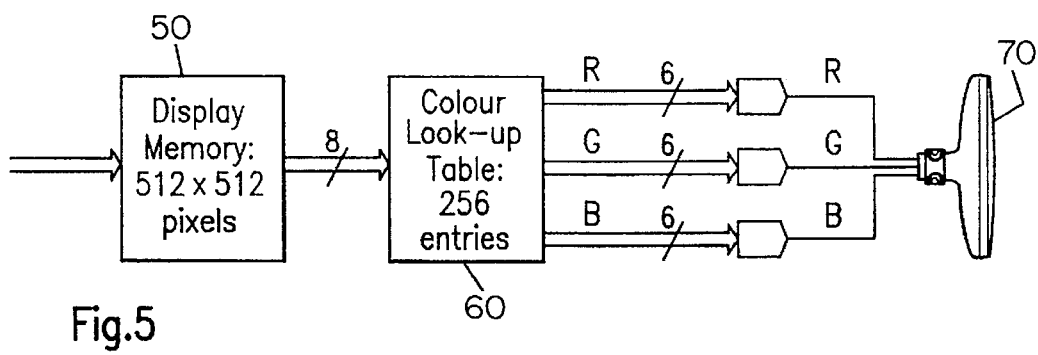
FIG. 5 illustrates a system used to allocate an image value to each display pixel.

The advantage of this interpolation scheme is that the allocation pattern can be predetermined and built into the display software source code. The decisions of which primary image pixel value to assign to each display pixel do not depend on the actual primary image pixel values, which vary with time. Clearly the allocation pattern can be repeated from one grid to the next, in other words, between every group of four neighbouring pixels from the set of primary image pixels; or an individual allocation pattern can be generated for each grid across the display. Either way, the pattern is preset and for each frame the display system merely needs to 'look up' which actual colour value to assign to each display pixel. In practice, this is done by means of a display memory, in which the allocation pattern is constructed, and a 'colour look-up table' which is updated for each frame. FIG. 5 schematically shows a system used to implement this technique.

The EIT display represented in FIG. 5 is designed around the Inmos IMS B007 evaluation board, a graphics display board with a 20 MHz T800 Transputer, 0.5 megabytes of a display memory 50 providing two 512×512 display 'pages' with 8 bits per pixel, and a 256-entry programmable colour look-up table (CLUT) 60 through which each display pixel's value is translated into a colour on the CRT screen 70.

The display memory 50 contains a colour number m which is input for each display pixel according to its position (x,y). This number is then referenced against the colour look-up table updated for the current frame to determine which colour is to be associated with which display pixel c(m). It is much faster to update the CLUT 60 contents for each frame than to update the contents of the display memory. The colour c(x,y) is displayed by the display system's hardware to make up the image. The speed of the image display is independent of the size and shape of the displayed image, as the computation time is the time required to reprogram the CLUT 60. For example, on the CRT 14-inch screen an image 95 mm in diameter is used. This is 224 display pixels in diameter.

EIT images can be displayed very quickly on low-cost display hardware by making use of the method described above, providing the hardware supports 8-bit pixels and a colour look-up table. The IBH-PC VGA or Super VGA display, for example, is adequate for this purpose.

The individual images (i.e. the successive stationary frames) produced by this interpolation method described above are not of very high visual quality, as the dithering pattern is discernible. However, in the moving image produced by a sequence of such frames the effect is masked and thus far less noticeable, and the images are visually acceptable.

The technique described above uses a random or pseudo-random number generator and bilinear weightings in setting up the allocation pattern or patterns for the display memory.

However, any appropriate formula for the weighting factors may be used for setting up the allocation pattern, to approximate to any interpolation. For example, the technique above uses the four corner primary image pixels in determining weightings in a region defined between them, but any or all of the primary image pixels may be used in appropriate formulae. Also, the dither pattern need not be random or pseudo-random. In fact, a satisfactory or perhaps even better dither pattern may be achieved by using a qualitatively chosen regular or irregular allocation pattern instead of one automatically generated, so long as the decision as to which primary image pixel assignment to select is biased in favour of the most nearly adjacent primary image pixel or pixels.

For example, if two primary image pixels with primary image values A and B are the end members of a row or column of sixteen display pixels, a very satisfactory allocation pattern for the row or column is:

A A A B A A B A B A B B A B B B, which gives a suitably spatially dithered transition from a preponderantly A image value at one end to a preponderantly B image value at the other.

If this pattern is applied to both the rows and the columns of a 16×16 pixel array having the primary image values A, B, C and D applied to its four corner pixels, the resulting allocation for the 16×16 array is:

```
A   A   A   B   A       A   B       A   B       A   B       B   A       B   B   B
A   A   A   B   A       A   B       A   B       A   B       B   A       B   B   B
A   A   A   B   A       A   B       A   B       A   B       B   A       B   B   B
D   D   D   c   d       d   c       d   c       d   c       c   d       C   C   C
A   A   A   b   A       A   B       A   B       A   B       B   a       B   B   B
A   A   A   b   A       A   B       A   B       A   B       B   a       B   B   B
D   D   D   c   D       D   c       d   c       d   C       C   d       C   C   C
A   A   A   b   A       A   b       A   B       a   B       B   a       B   B   B
D   D   D   c   D       D   c       D   C       d   C       C   d       C   C   C
A   A   A   b   A       A   b       a   b       a   B       B   a       B   B   B
D   D   D   c   D       D   C       D   C       D   C       C   d       C   C   C
D   D   D   c   D       D   C       D   C       D   C       C   d       C   C   C
A   A   A   b   a       a   b       a   b       a   b       b   a       B   B   B
D   D   D   C   D       D   C       D   C       D   C       C   D       C   C   C
D   D   D   C   D       D   C       D   C       D   C       C   D       C   C   C
D   D   D   C   D       D   C       D   C       D   C       C   D       C   C   C
``` where a, b, c and d mean the same as A, B, C and D respectively and where the above linear allocation pattern is applied to each edge row and edge column of the array and also to each other row and column (with the intermediate pixels of each row or column each having the same image value as one or other of the two end pixels). In one modification of this allocation pattern, those A pixels marked a may instead be allocated the image value C, and the B, C and D pixels marked b, c and d respectively may similarly have allocated to them, instead, the image values D, A and B respectively. This has the effect that all the display pixels associated by the allocation pattern with a particular corner pixel, so as to receive the same image value, are then in the same half of the array, when diagonally divided, as that corner pixel. In another modification of the allocation pattern, additional or alternative to that just described, additional spatial dithering may be incorporated by interchanging the image value allocations of pairs of adjacent but differently allocated pixels, the pairs being selected on a regular or arbitrary basis across the whole array.

A similarly constructed allocation pattern for use with a 32×32 array of pixels, with the markings a, b, c and d having the same significance as above, is:

```
A A A A A B A A A A B A A A B B A A B B B A B B B B A B B B B B
A A A A A B A A A A B A A A B B A A B B B A B B B B A B B B B B
A A A A A B A A A A B A A A B B A A B B B A B B B B A B B B B B
A A A A A B A A A A B A A A B B A A B B B A B B B B A B B B B B
A A A A A B A A A A B A A A B B A A B B B A B B B B A B B B B B
D D D D D c d d d d c d d d c c d d c c c d C C C C d C C C C C
A A A A A b A A A A B A A A B B A A B B B A B B B B a B B B B B
A A A A A b A A A A B A A A B B A A B B B A B B B B a B B B B B
A A A A A b A A A A B A A A B B A A B B B A B B B B a B B B B B
A A A A A b A A A A B A A A B B A A B B B A B B B B a B B B B B
D D D D D c D D D D c d d d c c d d c c c d C C C C d C C C C C
A A A A A b A A A A b A A A B B A A B B B a B B B B a B B B B B
A A A A A b A A A A b A A A B B A A B B B a B B B B a B B B B B
A A A A A b A A A A b A A A B B A A B B B a B B B B a B B B B B
D D D D D c D D D D c D D D c c d d C C C d C C C C d C C C C C
D D D D D c D D D D c D D D c c d d C C C d C C C C d C C C C C
A A A A A b A A A A b A A A b b a a B B B a B B B B a B B B B B
A A A A A b A A A A b A A A b b a a B B B a B B B B a B B B B B
D D D D D c D D D D c D D D C C D D C C C d C C C C d C C C C C
D D D D D c D D D D c D D D C C D D C C C d C C C C d C C C C C
D D D D D c D D D D c D D D C C D D C C C d C C C C d C C C C C
A A A A A b A A A A b a a a b b a a b b b a B B B B a B B B B B
D D D D D c D D D D C D D D C C D D C C C d C C C C d C C C C C
D D D D D c D D D D C D D D C C D D C C C d C C C C d C C C C C
D D D D D c D D D D C D D D C C D D C C C d C C C C d C C C C C
D D D D D c D D D D C D D D C C D D C C C d C C C C d C C C C C
A A A A A b a a a a b a a a b b a a b b b a b b b b a B B B B B
D D D D D C D D D D C D D D C C D D C C C D C C C C D C C C C C
D D D D D C D D D D C D D D C C D D C C C D C C C C D C C C C C
D D D D D C D D D D C D D D C C D D C C C D C C C C D C C C C C
D D D D D C D D D D C D D D C C D D C C C D C C C C D C C C C C
D D D D D C D D D D C D D D C C D D C C C D C C C C D C C C C C
```

In this case also, the allocations of regularly or arbitrarily chosen pairs of adjacent but differently allocated pixels may be interchanged in order to increase the degree of built-in spatial dithering effect.

Figure 6:
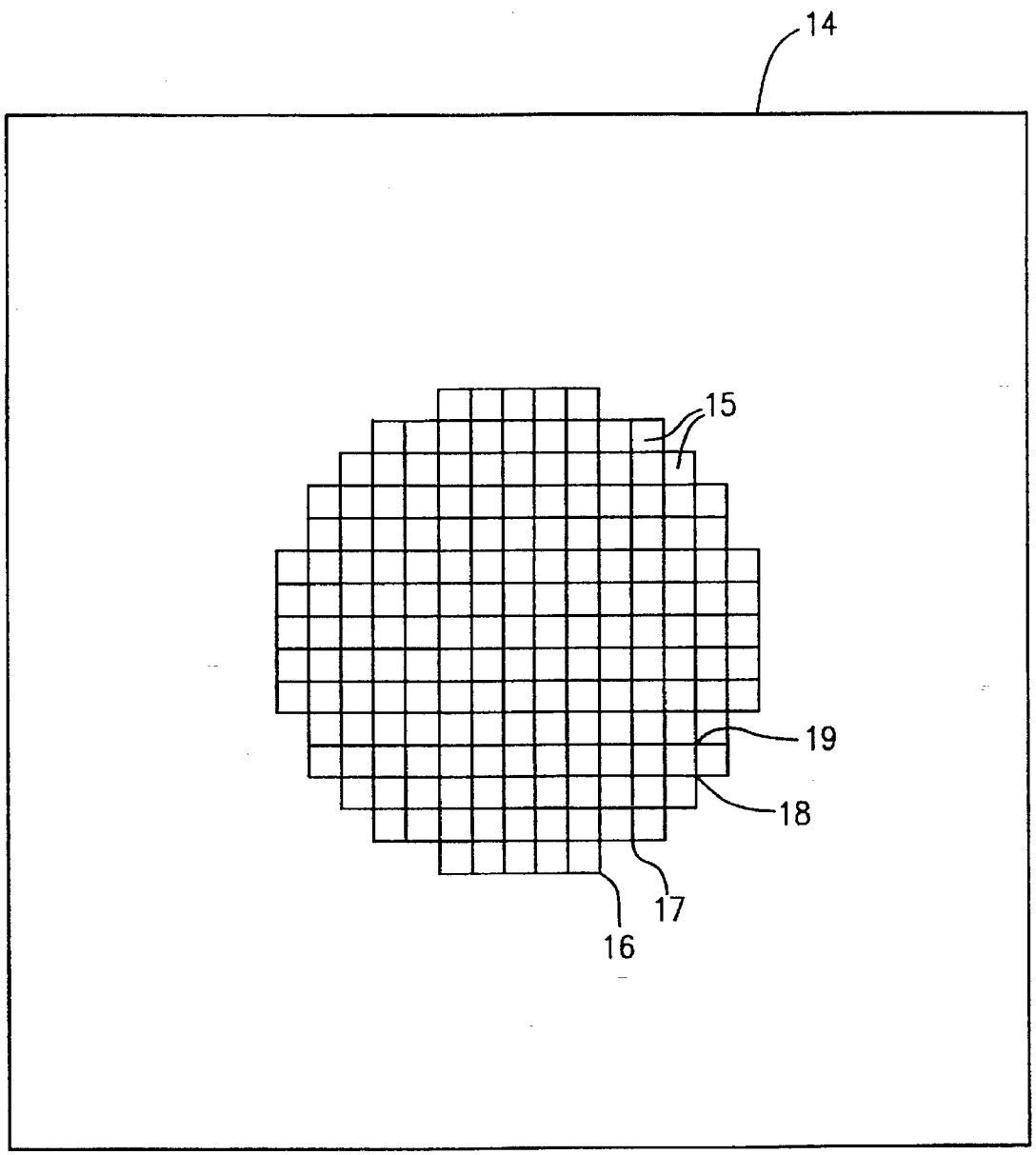
FIG. 6 shows sub-division of the central area of a display screen into a plurality of square arrays of pixels of the screen.

FIG. 6 represents a display screen 14 having a square array of 512×512 pixels, of which those near the centre are divided into 177 subsidiary square arrays 15, each containing 16×16 pixels, which cover an approximately circular part of the screen 14. The corners of the arrays 15 occupy a total of 208 corner locations 16, 17, 18 and 19 at which are located one corner of each of one, two, three or four, respectively, of the arrays 15. In use, a different one of 208 derived image values may be applied at each of the corner locations 16, 17, 18 and 19, i.e. to the respective corner pixel of each array 15 which has a corner there. Thus, at a corner location 19, where each of four arrays 15 has a corner, the image value applied to that corner location will be applied to four mutually adjacent corner pixels, one from each of the four arrays. Each array 15, therefore, has a respective image value applied to each of four corner pixels, which are its primary image pixels, and the image value applied to any one of its primary image pixels is also applied to all the remaining pixels of the array which are associated with that primary image pixel in accordance with the allocation pattern for the respective array, or with the overall allocation pattern if it covers all the pixels of the 177 arrays 15. If each array 15 has its own allocation pattern, these may all be identical and may, for example, be like the 16×16 allocation pattern disclosed above, or one of the disclosed modifications thereof.

Figure 7:
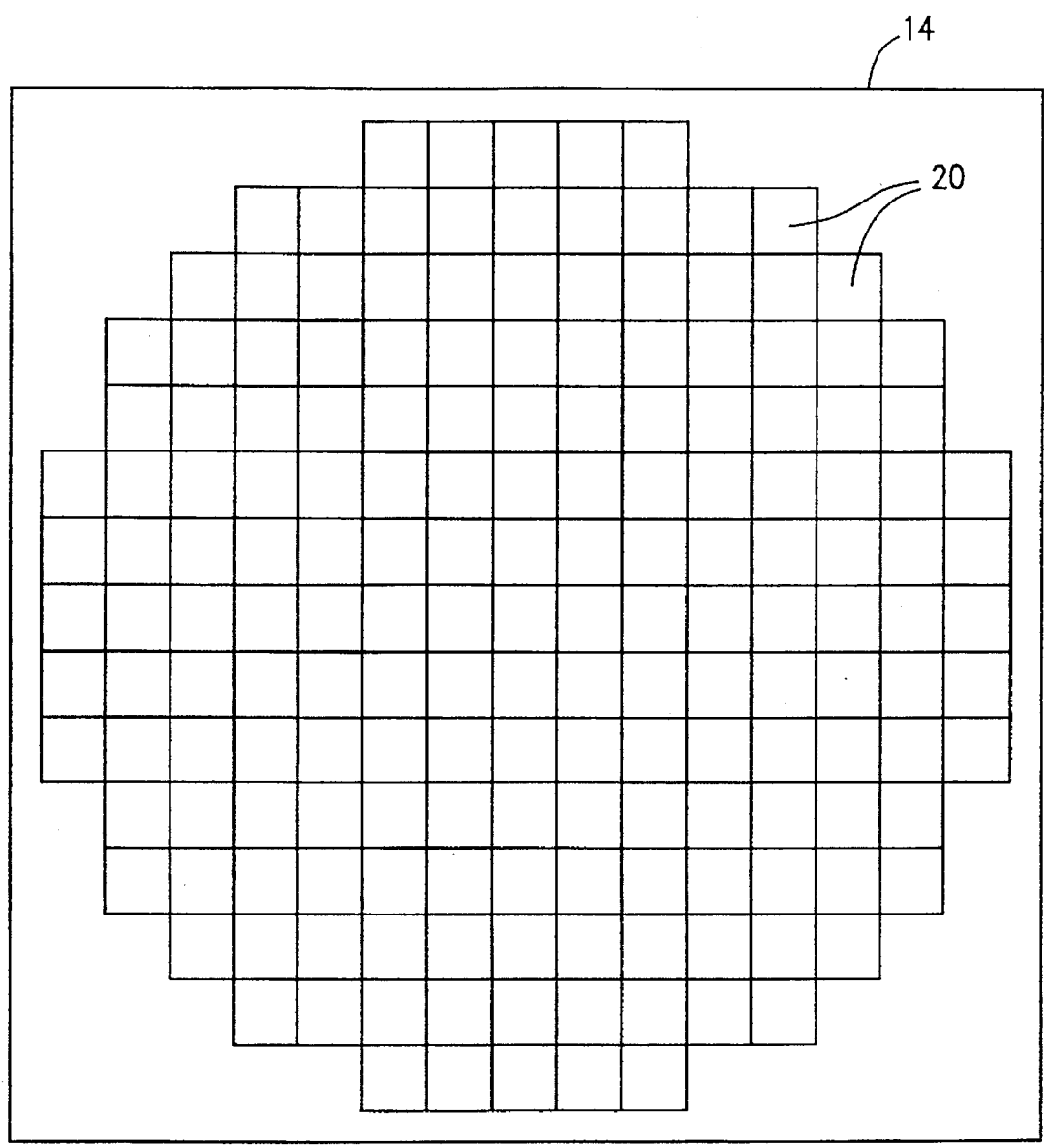
FIG. 7 is similar to FIG. 6 but shows larger square arrays of pixels, covering a larger part of the area of the display screen.

If it is desired to spread the image which is to be displayed across a larger proportion of the screen 14, the majority of its 512×512 pixels may be divided into 177 square arrays 20 each of 32×32 pixels, as shown in FIG. 7. The pattern of 208 corner locations, to which the primary image values are applied, is the same as in FIG. 7, and the allocation patterns for the arrays 20 may be like the 32×32 allocation pattern described above, or one of its described modifications.

The final image can be given a smoother circular outline than that shown in FIGS. 6 and 7 by using a circular 'mask' on the image. This can be done when the image is written into memory, so that it does not affect the computation time required to display each image.

In addition to updating the CLUT during the vertical blanking interval between display frames, it can be updated during the frame scan itself. This allows the simultaneous display of more than one image. For example, two images may be simultaneously displayed in the top and bottom halves of the screen with the CLUT being reprogrammed midway through the frame scan, giving the opportunity to display two different types of physiological information at the same time.

Embodiments of the invention illustrated in the accompanying figures and described above are given by way of example only, and it should be understood that these in no way limit the invention, which is intended to embrace all other embodiments that fall within the spirit and scope of the appended claims.

We claim:

1. A method of enhancing a displayed image for an image display apparatus, comprising the steps of:

using signal processing means to generate input image signals representative of image data, and designating an array of pixels based on said signals, designating as primary image pixels a limited plurality of display pixels within said array of pixels, determining an allocation pattern such that each remaining display pixel within said array is associated with a particular one of the primary image pixels, determining an image value for each of the primary image pixels, applying each determined image value to the respective primary image pixel and to each of the remaining pixels which is associated therewith, wherein the allocation pattern is such that a distribution of the display pixels associated with each primary image pixel is, at a distance from the respective primary image pixel, increasingly sporadic with increasing distance from said respective primary image pixel, and utilizing said distribution of display pixels to output on the display apparatus an interpolated image based on said image data.

2. A method according to claim 1, wherein the allocation pattern is determined on a probabilistic basis, the association of each said remaining display pixel with a primary image pixel being randomly chosen, subject to a calculated weighting factor favoring a most nearly adjacent image pixel.

3. A method according to claim 2, wherein the weighting factor favoring a particular primary image pixel is linearly dependent on a distance between the remaining display pixels and said particular primary image pixel.

4. A method according to claim 1, wherein the allocation pattern is qualitatively selected to enhance the subjective quality of the resulting image.

5. A method according to claim 1 wherein said method is used in the generation of each of a series of images in sequence from successive sets of image data, and wherein the allocation pattern is maintained unaltered for the entire series of images.

6. A method according to claim 5, wherein each set of image data comprises image values for said primary image pixels, and wherein said method further comprises utilizing a display memory containing memory means for storing a respective image value number for each display pixel of said array according to said allocation pattern, and utilizing a register programmable with each image data set, the content of the register being updated for successive image data sets, and wherein the display memory is arranged, for each successive data set, to read from the register image values corresponding to each image value number.

7. A method according to claim 6, wherein the register is updated within an image frame.

8. A method according to claim 1, wherein said method is used in dynamic tomographic imaging.

9. An apparatus for interpolating an image from a plural number of image values for a display having an array of display pixels more numerous than the number of image values, comprising:

means for generating image signals based on image data representing an image of a living body and for designating an array of pixels based on said image signals, means for designating as primary image pixels a limited plurality of display pixels within said array of pixels, means for applying said image values each to a respective one or more of said primary image pixels, and means for respectively applying said image values to the remaining display pixels of the array according to an allocation pattern associating each remaining display pixel with a particular one of the primary image pixels, such that the distribution of display pixels associated with each primary image pixel is, at a distance from the respective primary image pixel, increasingly sporadic with increasing distance from said respective primary image pixel.

10. A device for interpolating an image for an image display system, comprising:

means for generating image signals based on image data representing an image of a living body and for designating an array of pixels based on said image signals, means for designating as primary image pixels a limited plurality of display pixels within said array of pixels, means for determining an allocation pattern wherein each remaining display pixel of the array is associated with a particular one of the primary image pixels, means for determining an image value for each of the primary image pixels, and means for applying each determined image value to the respective primary image pixel and to each of the remaining pixels which is associated therewith, wherein the allocation pattern is such that the distribution of display pixels associated with each primary image pixel is increasingly sporadic with increasing distance from the respective primary image pixel.

11. A method of enhancing a displayed tomographic image for an image display apparatus, comprising the steps of: generating input image signals based on an image of a living body through use of tomographic data acquisition equipment, and generating an array of pixels based on said signals, designating as primary image pixels a limited plurality of display pixels within said array of pixels, determining an allocation pattern wherein each remaining display pixel within said array is associated with a particular one of the primary image pixels, determining an image value for each of the primary image pixels, applying each determined image value to the respective primary image pixel and to each of the remaining pixels which is associated therewith, wherein the allocation pattern is such that the distribution of display pixels associated with each primary image pixel is increasingly sporadic with increasing distance from said respective primary image pixel, and utilizing said distribution of display pixels to output on the display apparatus an interpolated image based on said image signals.

\* \* \* \* \*